(12) United States Patent
Tabe

(10) Patent No.: US 6,989,740 B2
(45) Date of Patent: Jan. 24, 2006

(54) ADVANCED AUDIO SAFETY APPARATUS

(76) Inventor: Joseph A. Tabe, 525 Thayer Ave., Suite 315, Silver Spring, MD (US) 20910

( * ) Notice: Subject to any disclaimer, the term of this patent is extended or adjusted under 35 U.S.C. 154(b) by 105 days.

(21) Appl. No.: 10/073,236

(22) Filed: Feb. 13, 2002

(65) Prior Publication Data
US 2002/0118103 A1 Aug. 29, 2002

Related U.S. Application Data

(63) Continuation-in-part of application No. 08/768,581, filed on Dec. 18, 1996.
(60) Provisional application No. 60/268,572, filed on Feb. 15, 2001.

(51) Int. Cl.
*B60Q 1/26* (2006.01)

(52) U.S. Cl. .................. 340/463; 340/433; 340/692; 180/271; 369/21; 704/200
(58) Field of Classification Search .............. 369/21; 340/463, 433, 436, 692, 691.1, 903, 456, 340/453, 471; 180/167, 271; 704/200
See application file for complete search history.

(56) References Cited

U.S. PATENT DOCUMENTS

| | | | | |
|---|---|---|---|---|
| 4,426,691 A | * | 1/1984 | Kawasaki | .................. 369/21 |
| 4,438,422 A | * | 3/1984 | Nojiri et al. | ................. 340/460 |
| 5,245,694 A | * | 9/1993 | Zwern | ........................ 704/200 |
| 5,493,269 A | * | 2/1996 | Durley et al. | ............... 340/433 |
| 6,476,730 B2 | * | 11/2002 | Kakinami et al. | ....... 340/932.2 |

* cited by examiner

*Primary Examiner*—Davetta W. Goins

(57) ABSTRACT

An audio safety apparatus for vehicles and equipment that operate in a reverse mode using Electro-mechanical or mechanical means adaptable to various electro-mechanical applications. The apparatus is used for cars, buses, trucks, planes or any other vehicle that moves and has a battery as part of its power supply. The audio safety apparatus has a backing safety system, a school bus stop sign arm safety system, and a driver information safety system. Through a system of hardware connected to a CPU (central processing unit), a sound chip and a waterproof speaker, the apparatus is programmed to recognize dangerous vehicle situations and alert the operator of a vehicle in an audible manner before accidents occur. The audio safety apparatus includes a driver inspection program for use before the vehicle is put in operation or put to motion. With the voice auditory warnings, the apparatus is programmed to sound when the vehicle is backing or unloading occupants, or any other potentially dangerous activity in which a passerby to the vicinity of the vehicle or the operator of the said vehicle may become subjected to injuries.

20 Claims, 7 Drawing Sheets

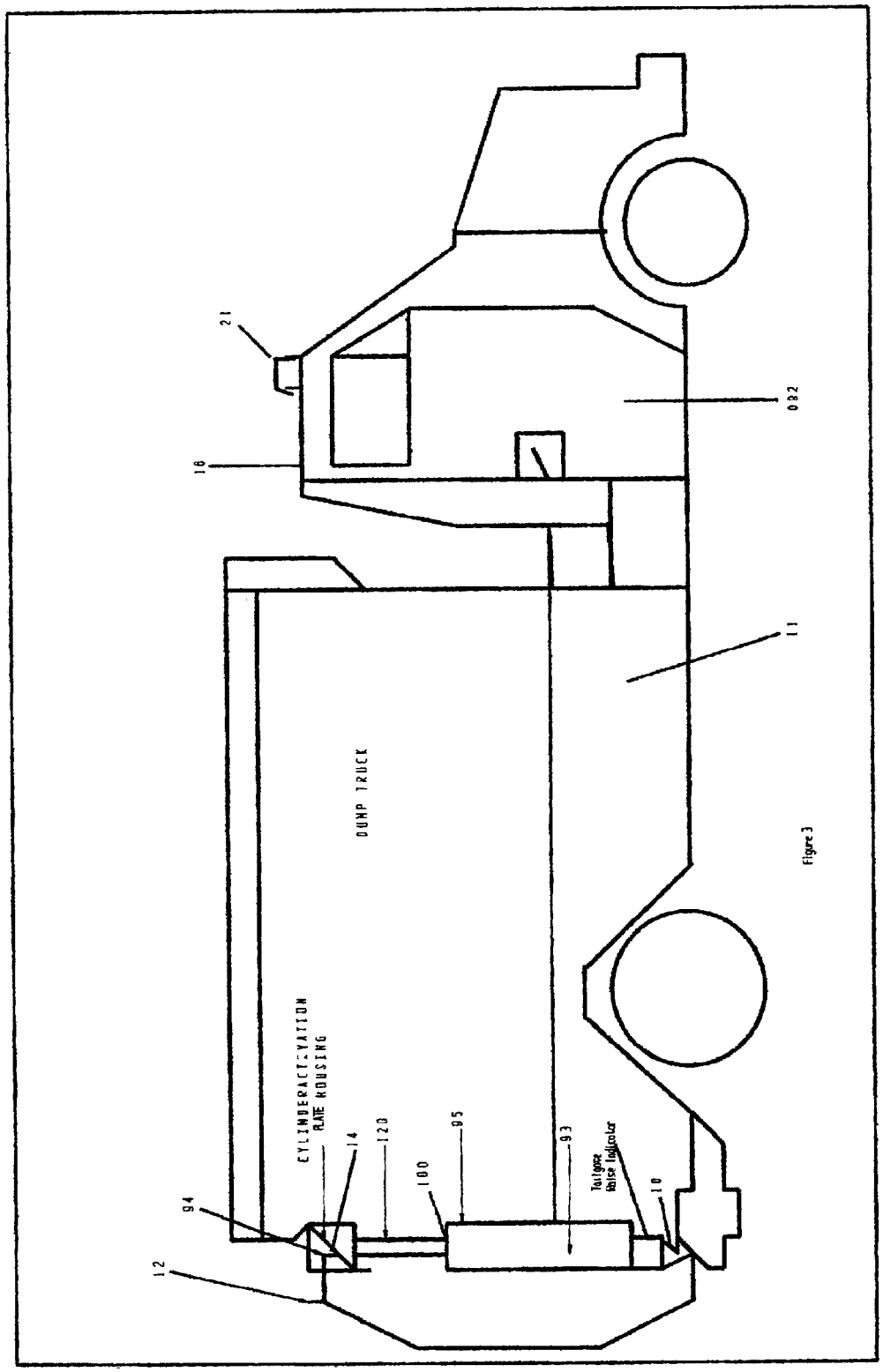

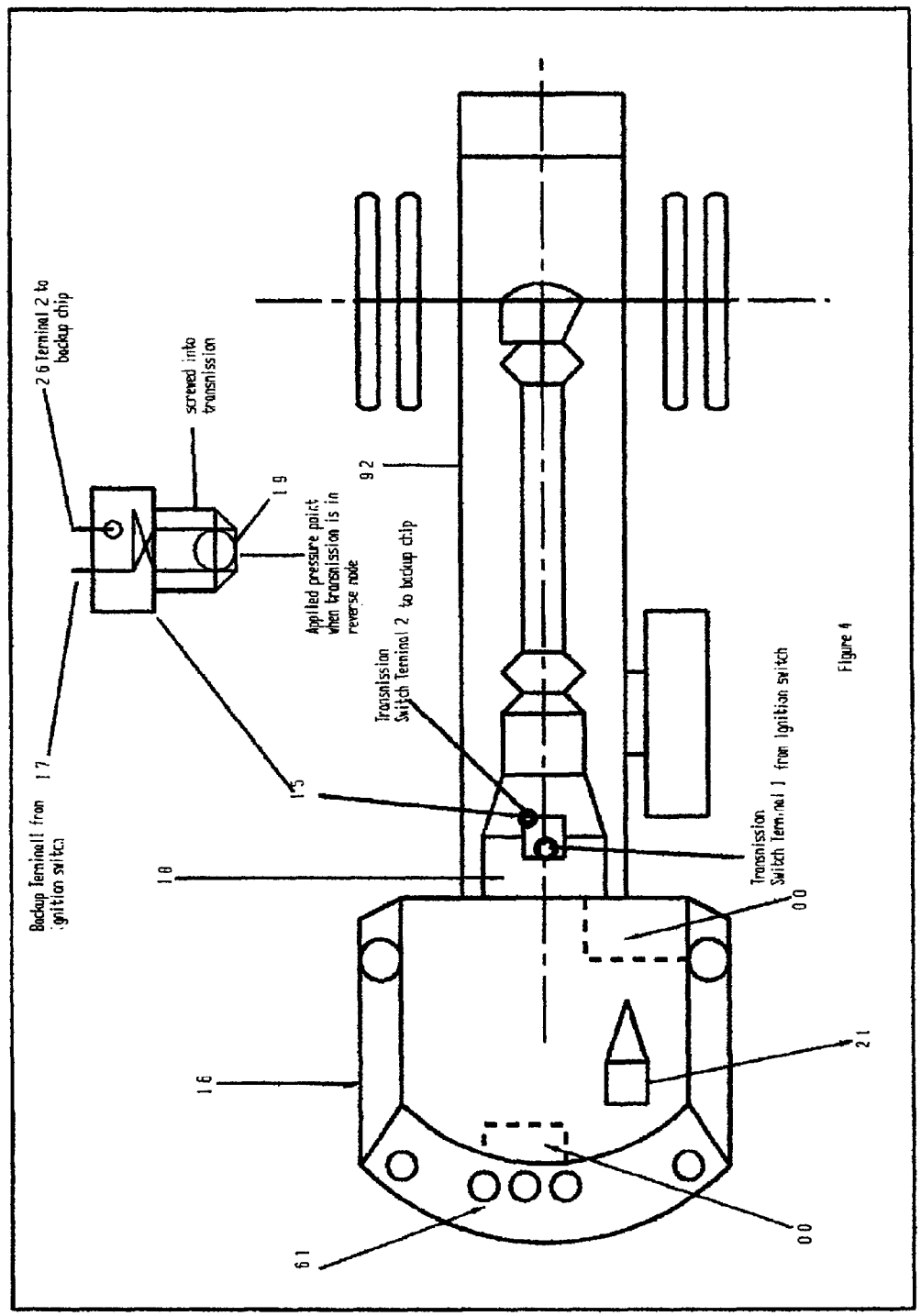

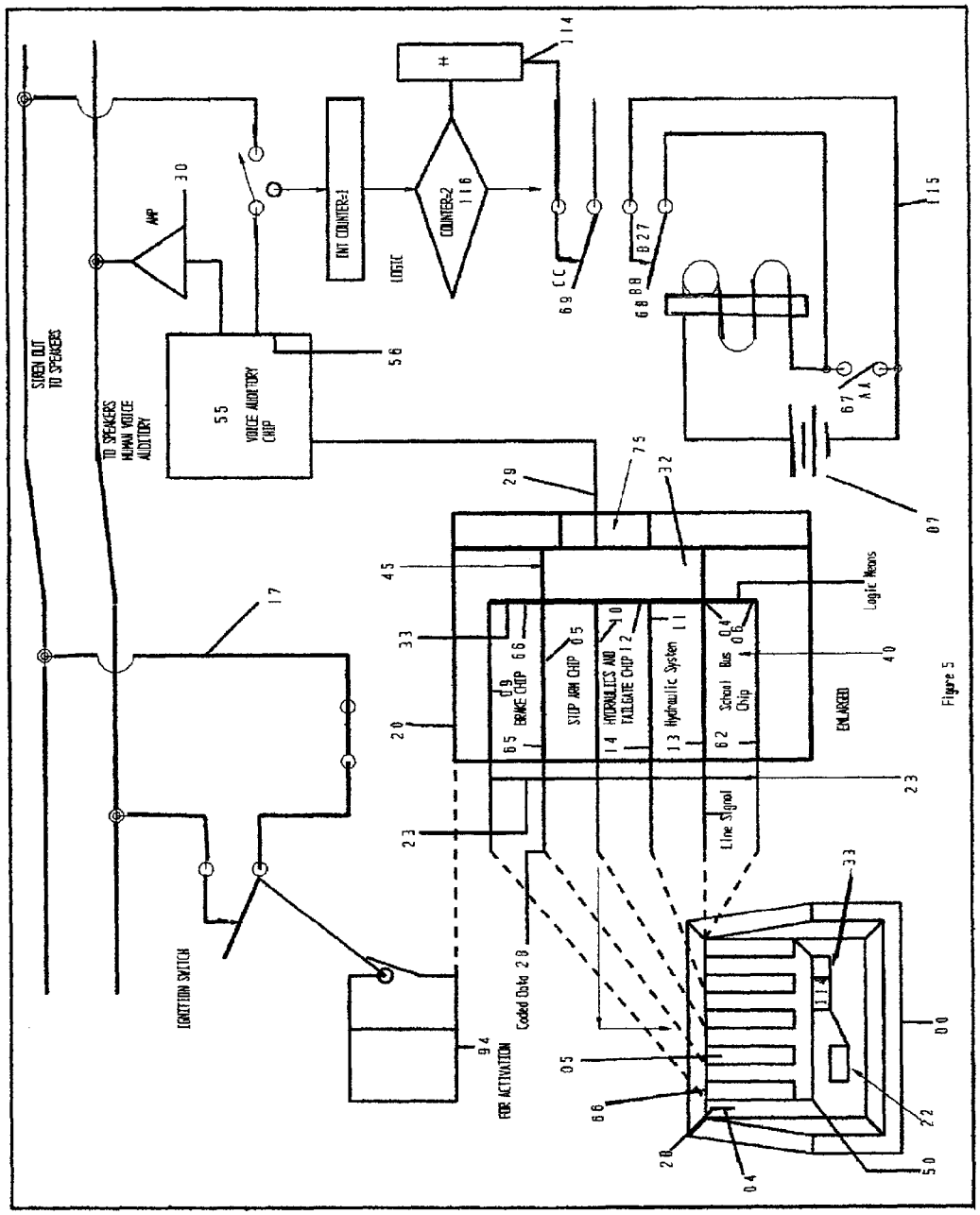

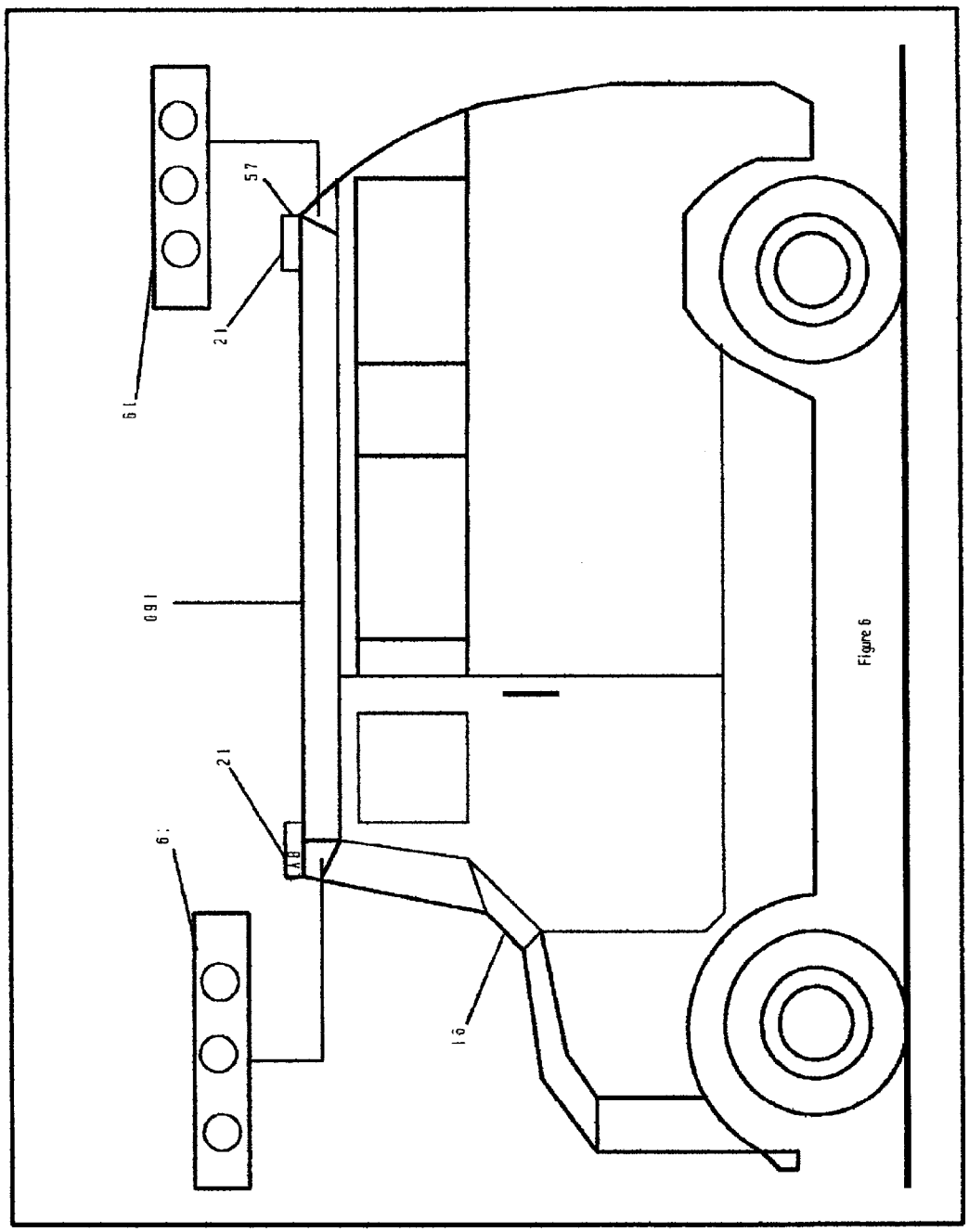

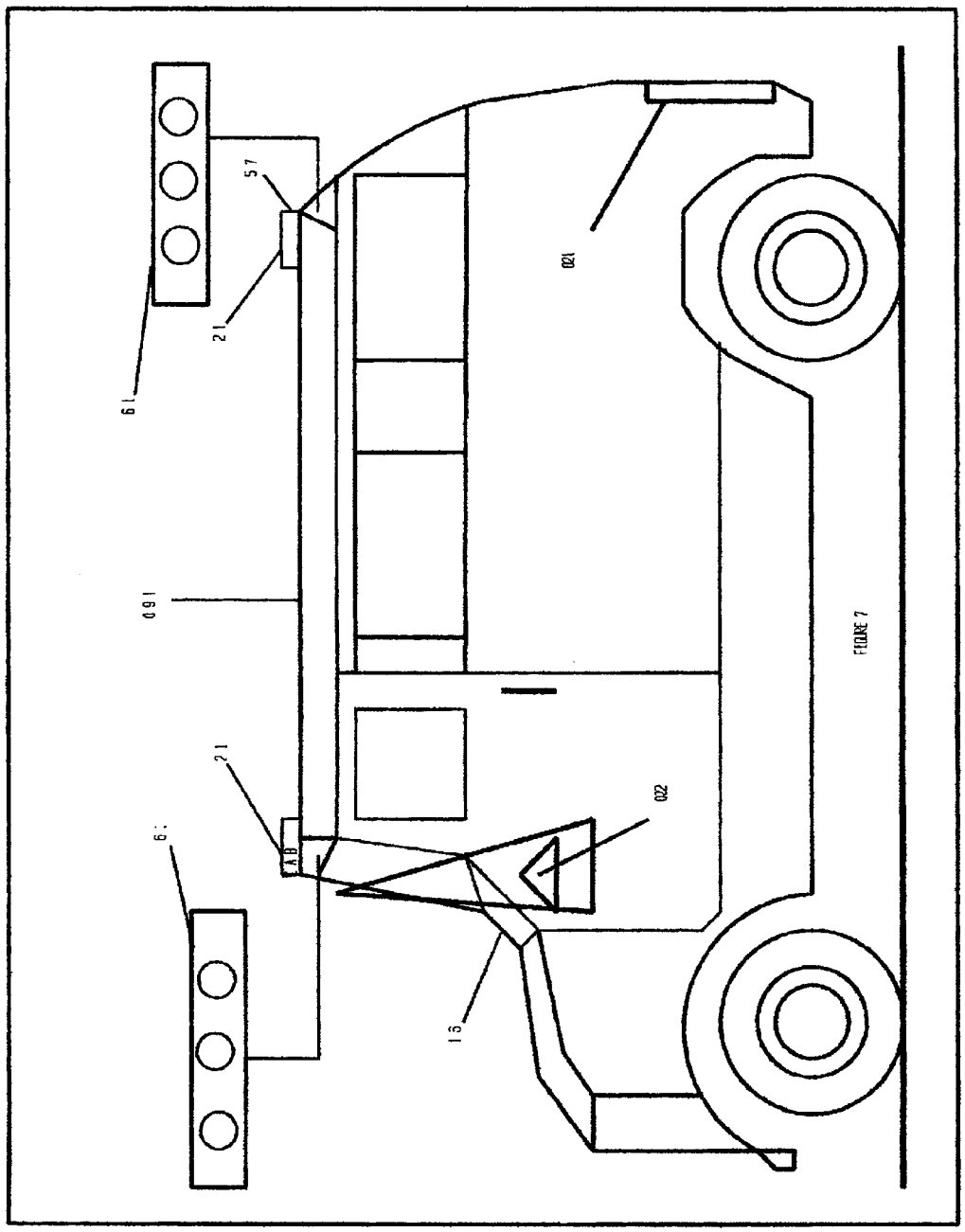

ADVANCED AUDIO SAFETY APPARATUS

I hereby claim priority benefits under 35 USC 119 of the Application, Ser. No. 60/268,572, filed Feb. 15, 2001, and Utility Application Ser. No. 08/768,581, filed Dec. 18, 1996.

FIELD OF THE INVENTION

The present invention relates generally to warning devices, and more specifically, to an audio safety apparatus with simulated voice warning signals serving to protect workers and others within the vicinity of moving vehicles and the like. The audio safety apparatus is compact, easily mountable within existing vehicles, and provides multiple settings for warning in case of various, commonly encountered situations.

BACKGROUND OF THE INVENTION

The work environment has become laden with unsafe practices, many of which are reasonably necessary to accomplish certain tasks. As safety in the work environment has become increasingly important, new attempts to prevent accidents have been implemented. The Occupational Safety and Health Administration are responsible for instituting a number of remedial measures to ensure a safe work atmosphere. However, there are many risks associated with the work environment, which impact non-workers.

Operations involving school buses and heavy equipment remain especially susceptible to unanticipated safety breaches. In many instances, a heavy vehicle operator is not aware of another person's presence near the heavy vehicle; quite simply, the physical size of the heavy vehicle impedes the operator's full view of the immediate surroundings.

Even high mounted rear mirrors only give a partial view of what is directly behind a large vehicle, and then only for a few feet. Often, a school bus driver is unable to ascertain whether all children have cleared the school bus' vicinity. While various combinations of lights and physical barriers have been introduced to meet conventional demands and to provide the safety needed, they require a fair amount of time to be effectively activated and often result in unanticipated safety complications. Motorists and pedestrians alike simply do not react to the breadth of measures instituted to prevent accidents. Clearly, there exists a need for a vehicular safety device which prevents common injuries associated with moving vehicles, while at the same time, does not create further unsafe conditions.

Heretofore, audio devices have been employed to warn of moving vehicles. The sounds heard when some trucks move in reverse attempt to warn nearby individuals of a hazardous situation. However, such sounds are not readily recognizable in areas of heavy traffic. Moreover, the resultant behavior of passerby cannot be forcibly controlled. A simple "chirp" sound might cause one to give attention, but does not communicate any discernible message. Further, despite the implementations of various safety devices, preventable accidents continue to occur with fatal results.

Specifically, many safety breaches are associated with vehicles braking or moving in a reverse direction. Owners of school bus and heavy truck fleets recount incidents in which their vehicles have impacted people who were not visible to the vehicles' operators.

Traditional audible signals, alone or in combination with flashing lights and physical barriers, are not completely effective in creating a zone of safety around vehicles. Also the vast amount of noise and commotion associated with loading docks prevents drivers from being able to accurately discern the proximity and number of individuals or objects near the vehicle. Accordingly, the need arises for an audio safety apparatus for use with various types of vehicles, which is easily installed and which introduces educational ideas to children, drivers, and the general public. The audio safety apparatus must provide for instantaneous information communication specific to situations and corresponding participants in a zone of danger. Moreover, the audio safety device should be capable of distributing various safety messages, so that any appropriate message can be repeated in connection with the current situation. The audio safety apparatus should be either a single piece of equipment capable of addressing a variety of safety concerns, or a collection of components wherein the apparatus would be tailored for situation specific accident prevention. There is plurality of inventions directed to large vehicle safety problems. The various patents described below are but illustrative of the developments commonly found in the field of the present invention.

U.S. Pat. No. 3,504,336 issued to Oliver W. Boblitz on Mar. 31, 1970, describes a safety seat belt warning system comprising a reel device for retracting a section of a seat belt when the belt is not fastened about an occupant of a motor vehicle. Pressure-sensitive electrical seat switches in the motor vehicle's seats are activated by the presence of a passenger.

If a passenger does not fasten a safety belt, a light or buzzer alert is enabled. The result is not capable of warning a driver, passengers, and pedestrians of vehicular movement or lack thereof. Thus, the Boblitz device cannot be used to provide an early warning signal for prevention of vehicle-pedestrian collisions, as provided by the present audio safety device. Further, Boblitz's device is incapable of delivering a plurality of messages to drivers, passengers, and others outside of the motor vehicle. Moreover, voice-chip technology is not contemplated.

U.S. Pat. No. 4,470,036 issued to John F. Doerr on Sep. 4, 1984, describes a safety light warning system for vehicles comprising three color coded lights to indicate driver foot position with respect to the brake and gas pedals. There is no provision for audio warning signals. Accordingly, the Doerr assembly cannot be used in conditions of low visibility, as no provision is made for communicating warning messages but for sustained illumination and flashing lights. Moreover, Doerr's device does not provide for a driver interface wherewith messages can be selectively broadcast.

U.S. Pat. No. 4,839,749 issued to Eustace B. Franklin, on May 19, 1987, describes an audio reminder system for drivers comprising an electronics system that automatically activates a tape recorder programmed to provide an audible speech message of a specific vehicle fault or a time-dependent personal message. Franklin's device specifically aims to provide a siren detector circuit, a speed indicator circuit and a timed personal message circuit.

Unlike the present invention, no means is provided for communicating messages to those outside a vehicle. Further, Franklin's device does not even contemplate the need to communicate with people outside a vehicle. Moreover, Franklin's device warns of vehicular irregularities and faults; but it does not provide means of broadcasting audible signals in response to the aggravated braking and irregular backing movement inherent in the operation of heavy trucks and buses. Franklin's device is of a remedial nature, whereas the present invention is characteristically prophylactic.

U.S. Pat. No. 4,916,372 issued to James Reavell et al. on Apr. 10, 1990, describes a school bus safety device wherein a stop sign or a crossing arm swings out upon the opening of the bus door. While Reveall's device does communicate with vehicles adjacent to a school bus, it does not provide for audible signals or warnings of any kind. Further, it is incapable of displaying alternating or situation specific messages, unlike the present invention.

U.S. Pat. No. 5,199,754, issued to Lowell J. D. Freeman on Apr. 6, 1993, describes a safety bar comprising a motor driven barrier for installation on the front end of a school bus. The result is not capable of adequately warning a driver, passengers, and pedestrians of vehicular movement or lack thereof. Freeman's device merely deters pedestrians from walking directly in front of the bus.

U.S. Pat. No. 5,210,521, issued to Gary M. Hojell on May 11, 1993, describes a safety warning system for vehicles comprising a Doppler radar system to detect nearby persons. When a person is detected close to the bus, the bus driver is warned, thereby increasing the possibility of avoiding an accident. There is no provision for communicating audio warning signals to individuals outside the school bus. Furthermore, Hojell's device is not capable of preventing individuals from wandering precariously close to a bus. The present invention avoids dangerous situations by communicating a warning message before an accident-prone situation develops. Moreover, Hojell's device does not provide for a driver interface wherewith messages can be selectively broadcast.

U.S. Pat. No. 5,226,686, issued to Glenn A. Triggs on Jul. 13, 1993, relates to a safety gate for school buses, which is mounted on the front bumper of a vehicle. The device is a physical barrier only, and does not attempt to communicate an audible warning.

U.S. Pat. No. 5,357,239, issued to Ronald C. Lamparter on Oct. 18, 1994, describes a safety bar and sign comprising a motor driven barrier for installation on the front end of a school bus, and also, a stop sign deployed simultaneously with the barrier. The result is not capable of audibly warning a driver, passengers, and pedestrians of vehicular movement or lack thereof. Similar to Freeman's device, Lamparter's device merely deters pedestrians from walking directly in front of the bus, but does nothing to warn them that the bus is about to move forward. The present invention warns a school bus driver to walk around the bus to ensure that all children have cleared the area before any further bus movement occurs.

U.S. Pat. No. 5,406,250, issued to James Reavell et al. on Apr. 11, 1995, discloses a cold weather stop sign for deployment in conjunction with the opening of a school bus door. Analogous to the prior art discussed above, Reavell's device encourages safe practices in the vicinity of school buses. Unlike the present invention, however, Reavell's device does not communicate an audible message.

U.S. Pat. No. 5,467,071, issued to Don M. Koenig on Nov. 14, 1995, describes a warning kit, which produces a visual safety warning to passengers of a vehicle, and to drivers of nearby vehicles, and audio safety prompting messages that are audible to the passengers. Unlike the present invention, Koenig's device is not capable of allowing a bus driver to emit a message to individuals outside of the bus who are not boarding. Further, Koenig's device is not capable of producing audio messages in response to movement of the vehicle itself, whereas the present invention produces audio messages in response to various input variables. The present invention sends messages to the bus driver with reference to the children inside the bus.

U.S. Pat. No. 5,510,763, issued to Norman Deckard et al. on Apr. 23, 1996, is directed to a strobe light on the back of a truck. The light is activated when the truck's transmission is either in reverse or in park, and is contingent upon operation of hazard lights. Unlike the present invention, Deckard's device is not capable of broadcasting an audio message in response the truck's transmission position.

U.S. Pat. No. 5,015,991 issued to William Barr on May 14, 1991,is directed to an alarm system for signaling thereof. The signal is enabled when a vehicles door is open and the selector lever of an automatic transmission is not in its full park position. Barr's device is not capable of broadcasting specifically, the exact prescribed message in response to the predetermined mechanical operation of the vehicle.

U.S. Pat. No. 4,923,852 issued to Jerome Lemelson on Jun. 12, 1990, is directed to a machine operation, which is subject to variations in its operational characteristics requiring adjustments, maintenance or replacement of machine parts. Lemelson device is not, and has no way of educating the operator about a specific predetermined mechanical behavior of the vehicle and did not teach a specific prescribed response to a predetermined mechanical condition of the said vehicle.

European Patent Publication No. 90-100731/14 EP-361, 104-A relates to trim fittings for the outside of a vehicle, wherein electronic display strips show programmed messages for road users. Unlike the present invention, no means of broadcasting an audio message is disclosed. None of the above noted patents, taken either singly or in combination, are seen to disclose the specific arrangement of concepts disclosed by the present invention.

SUMMARY OF THE INVENTION

The audio safety apparatus is a safety device for vehicles and equipment that can operate in a reverse motion using Electro-mechanical or mechanical means. The present invention may be used for cars, buses, trucks, or any other vehicle that moves and has a battery as part of its power supply.

The audio safety apparatus has a backing safety system, a school bus stop sign arm safety system, and a driver safety system. Through a system of hardware connected to a CPU (central processing unit), a sound chip and a waterproof speaker the present invention is programmed to recognize dangerous vehicle situations and alert the operator of the vehicle in an audible manner before accidents occur. The audio safety apparatus also includes an inspection program for use before the vehicle is in operation and audible warnings programmed to sound when the vehicle is backing, or unloading or any other potentially dangerous activity in which the passerby to the vehicle may become injured.

BRIEF DESCRIPTION OF THE DRAWING

FIG. 3 is seen to represent a dump truck with the water proof speaker mounted at top, a tailgate and a tailgate cylinder mounted at rear of the truck body showing the lifting and operating conditions.

FIG. 4 is seen to represent a transportation equipment having a cab with the advanced audio safety apparatus installed inside, a bed, and a transmission system, which activates a backup switch when engaged in a reverse motion.

Figure 1:
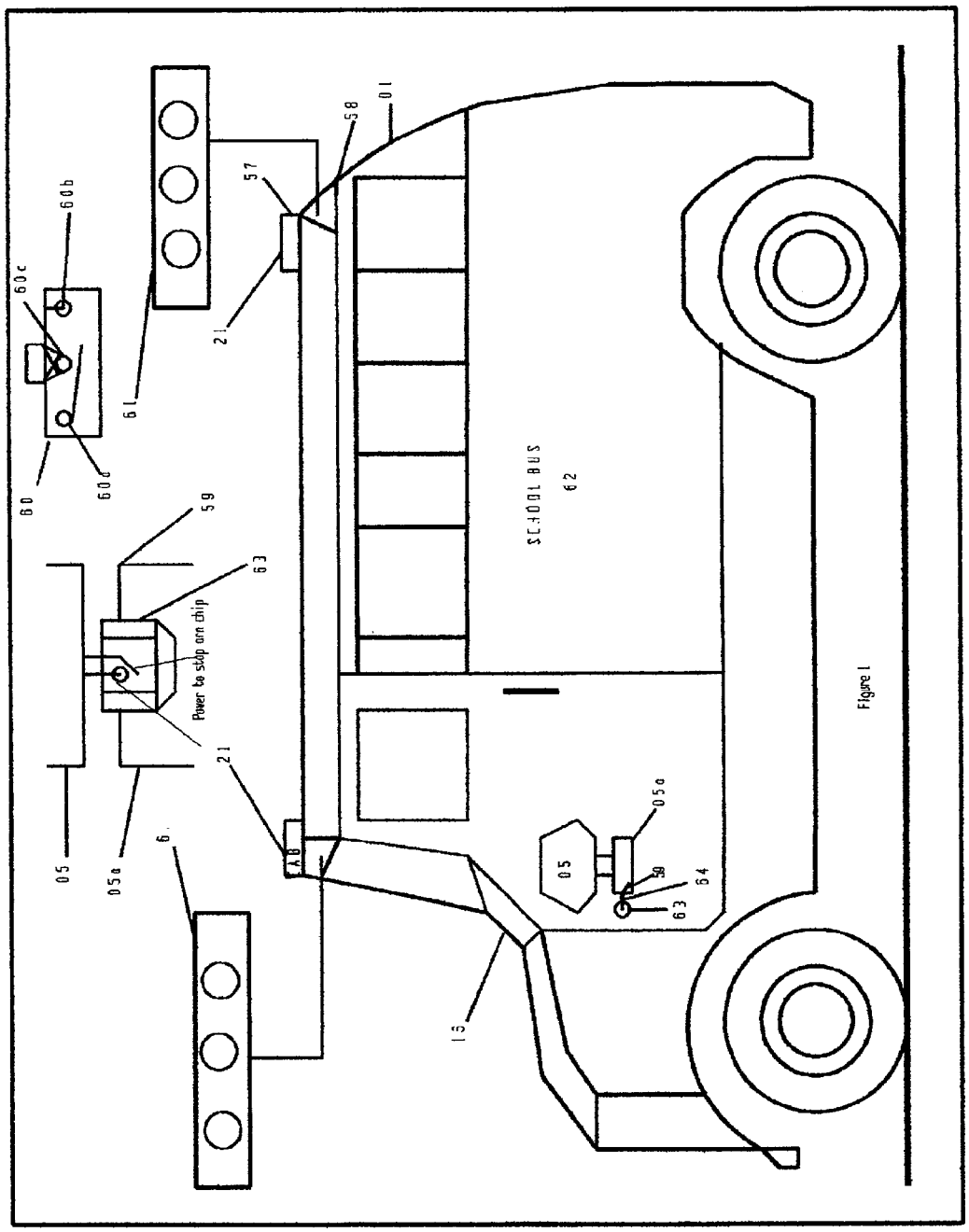
FIG. 1 is seen to represent a school bus with the stop arm safety and sequence of events and switch operation, which occur during the operation of the vehicle.
Figure 2:
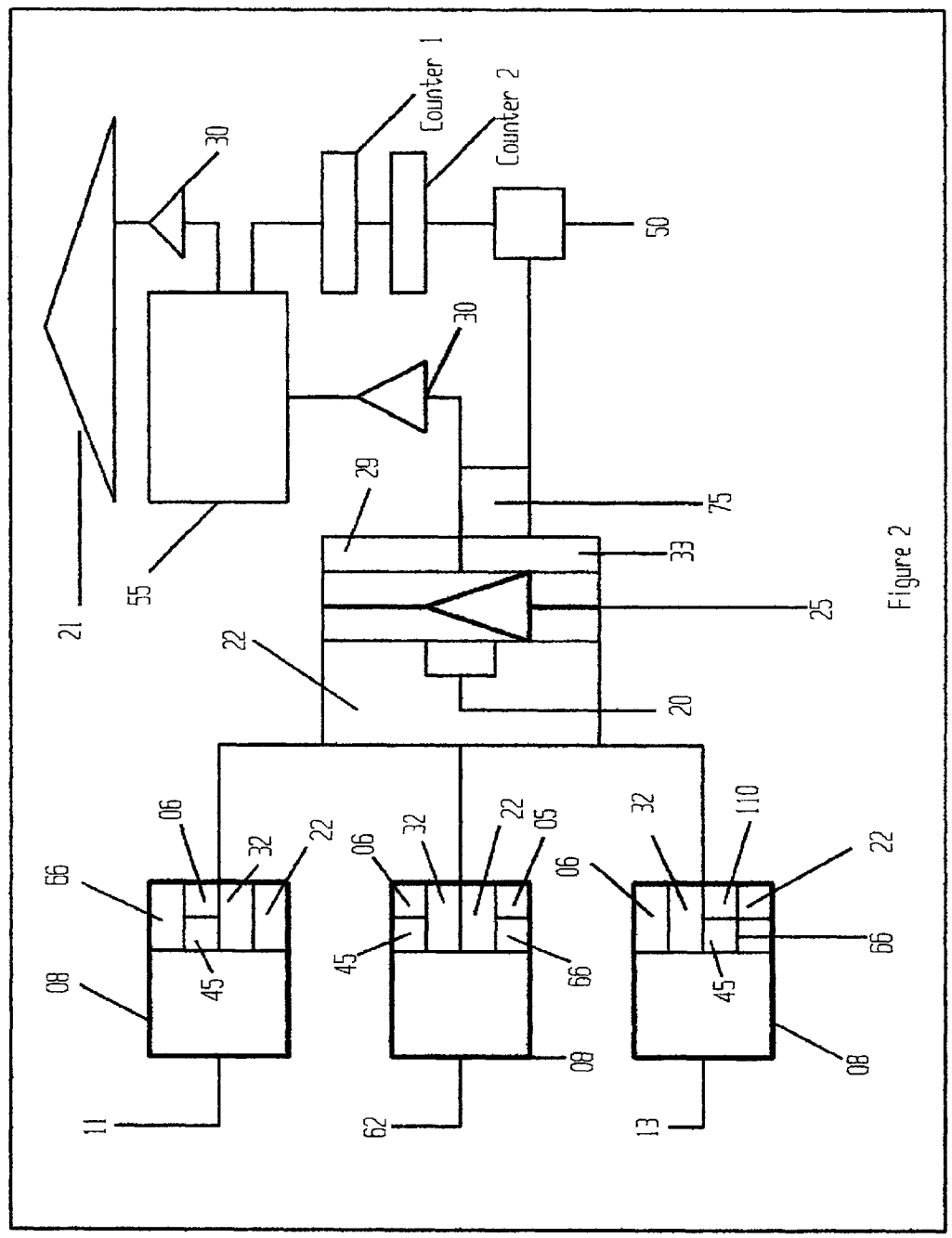
FIG. 2 is seen to represent a block diagram showing sequence of operations of components of the advanced audio safety apparatus.

On top of the cab is seen a waterproof speaker responsive for outputting responses.

FIG. 5 is seen to represent a circuit diagram of the present invention with components of the ignition switch, the data dictionary, the logic switch, the advanced audio safety apparatus, and the voice chip.

FIG. 6 is seen to represent a transportation bus (091) seen to emit voice auditory messages relating to the present invention.

FIG. 7 is seen to represent a transportation vehicle having a waterproof speaker mounted at the tail light (021) and a waterproof speaker mounted at the mirror brackets (022).

DETAILED DESCRIPTION OF THE PREFERRED EMBODIMENT

The present invention is seen to relate to an audio safety apparatus (00), for a vehicle (01), or other equipment, which engages in motion via automatic and manual transmission means. The present invention has voice auditory backing safety system (04); school bus stop sign arm voice auditory safety system (05), and driver alert voice auditory safety system (06). The present safety invention is intended to advance the safeties surrounding vehicle's mechanical and electromechanical operations such as transportation vehicle (09), hydraulic lift equipment (10), dumping equipment (11), tailgate mechanism (12), cement mixing and funneling equipment (13) and hydraulic cylinder operated devices (14). The present invention also relays a voice auditory educational system for operators of (09), (10), (11), (12), (13), (14) vehicles to use the step-by-step checks to inspect the said vehicles before any mechanical operation occurs. In this manner, the operators of the vehicles may detect trouble before it arises in the routine operation of the vehicles, which may create a much more hazardous situation. The present audio safety apparatus (00) is for use on cars and buses (091), trucks (092), and all transportation moving vehicles that use batteries (07), and which engages in reverse motion by either Electro-mechanical transmission or mechanical transmission. The present invention when assembled is hardware (08), with a logical interface means (20) for communication. Said hardware (08), is mounted in the cab (16) of any of (09), (10), (11), (12), (13), (14) vehicles, outputting signals to the attached waterproof exterior speaker (21).

The interface means (20), which is an interface module, is located inside the control module (22) or controller, for signal communication with the processor (32) and the stored data in the dictionary (23). The interface module (20) will receive data and coded instructions from the dictionary (23), enabling prescribed output signals to be broadcast through the speaker (21). The hardware (08) identifies the vehicle's physical components by using logical sequences enabled by the logic switch (115) to transmit coded data from the dictionary (23) to the CPU (22) (Central Processing Unit) of the audio safety apparatus (00) for processing. The counter (116) of the logic switch (115) counts the number of components that are operative and relay its findings to the software (114). The software (114) will then coordinate responses at the data dictionary (23), initiating the appropriate response. The CPU (22) then uses the processed sequences to transmit and emit a particular human voice warning phrases for a response, depending on the pending safety hazard environment. The voice auditory sound chip (55) is the voice auditory chip that is connected to the delay output (75). The present invention may be mounted atop a vehicle's cab (16), or alternatively, elsewhere within the vehicle and attached to an external waterproof speaker (21). The CPU (22) of the audio safety apparatus (00), is embedded with appropriate logical sequence to be applied, depending on the existing mechanical condition; e.g. the type of vehicle (09), (10), (11), (12), (13), (14) upon which it is mounted.

The logical sequence will start the appropriate data processing for the defined type of vehicle in regards to which messages and warnings are necessary. The warning information will be relayed via electronic circuitry from the vehicle's audio safety apparatus (00) to the waterproof speaker (21). The present invention has interactive safety data processing that enables reaction to different defined safety areas called fields (40). The fields are stored in a data format, and each field situation is defined in the data dictionary (23). The data dictionary (23) is interactive with the interface module (20) to enable safety data processing between the data dictionary and the said interface module. The interface module (20), which is an interface means embedded in the automatic controller (33), enables communication with the processor (22) and the data dictionary (23). The interface module (20) will receive data and coded instructions from the data dictionary (23), enabling prescribed output signals to the water proof speakers (21) for broadcasting to the surrounding. The data dictionary (23) stores coded definitions of the data elements as fields (40), e.g. trucks, school buses, buses, planes and their relationship to the particular type of field as records, i.e. components of the fields in its memory (45).

The data dictionary (23) allows for data abstraction from its memory (45) when a coded signal or electrical pulse is received from one of its records. The records are the defined mechanical components that are liable to mechanical failure. When data is abstracted from the memory (45) of the data dictionary (23), the amplifying device (30) will amplify and the voice auditory sound chip (55) will be enabled to simultaneously output a warning auditory to the speaker (21). The field records of the data dictionary (23), when tempered send signals or electrical pulses to the data processor (32), to determine and match the appropriate voice auditory signal (55), to sound through the speaker (21) to the surroundings of the fields (40). Data processing is controlled by the CPU (22), which will filter through the dictionary defined functions as part of the logical sequences, and relay to the voice auditory sound chip (55), which will then be amplified by the amplifier (30) to the speakers (21) for broadcasting. These dictionary-defined functions are enabled by signals or electrical pulses, from the electrical circuit of the type of vehicle it is installed in, to determine and define the appropriate safety perimeters for that particular vehicle or field. Vehicles are designed to carry different tasks and perform different functions. The electrical pulses provided through the circuitry signal responses to different mechanical operations of the records. When a field (40), like a cement mixing truck (13), is equipped with the audio safety device, its defined perimeter would be limited to the functional operation of it's records, such operations are energized by the electrical pulses and differentiated by it's records. Each safety breach situation will be assigned into a field in the data processor (32), to the data dictionary (23). These fields will enable output from the dictionary (23) to the voice auditory sound chip (55), thus emitting an appropriate voice auditory warning messages through the speakers (21). Recognizing that audio alerts are critical accompaniments to certain motor vehicular movement, the present invention employs a voice auditory backing system to prevent injuries when a vehicle moves in a backward direction. Initially, electrical current flows to one end of the switch terminal (26) of the backup switch (15), as part of the present invention, when the ignition (17) is activated. The backup switch (15) is located at the vehicle's transmission (18). Said switch (15) receives responses when the vehicle's transmission (18) is engaged in a backward or reverse motion.

As the vehicle's transmission (18) is engaged in a reverse motion, pressure is applied to the transmission end (19) of the switch (15), enabling it to complete its circuit and energize the backup chip (04) for a human voice auditory response. As the circuitry for the transmission switch is complete, electrical pulses are sent to the data dictionary to release the particular response prescribed for backing behavior. Said response is enabled when the transmission (18) is engaged in a reverse mode, allowing current to flow from the backup switch terminal (26) to the present invention's Terminal B (27). Adjusting or selecting the appropriate current required for activation of an appropriate response, the processor (32) will transmit signals to the voice auditory sound chip (55). The sound chip (55) will then emits the correct warning prescribed by the output of the processor at a delay in warning repetition of one second. The circuit path for any of the possible mechanical conditions, in which a safety breach may occur, logically uses I/O signaling. In this instance, "I" indicates a complete closed circuit and sends a logical "1" to the CPU (22) for signal activation. Accordingly, an "O" is an open circuit and sends a logical "0" which alerts the CPU (22), not to send a signal. The input unit (28), and output unit (29), of the data dictionary (23), which controls input and output signals, has coded data from its memory (45) to the relay (25). The relay (25) receives data through memory functions from the CPU (22), which empowers the signal to the amplifier (30) to the sound chip (55). The automatic controller (33) is required to control the energy source of the switches and responses with its ability to control large amount of power with a minimum of control energy. The automatic controller (33) acts as a computer module wherein coded signals are compared with requisite targets keyed to activate various human voice responses.

The control module controls the energy source of the switches. A voltage suppressor (50), which is attached to the input of the processor (32), pikes out excess voltage, thus protecting the audio safety apparatus. The horn auditory (56) signals alert individuals proximate to a vehicle equipped with the present invention, of vehicle movement. Specific activation of the conventional horn auditory signal (56) and/or the human voice auditory signals (55) results from the voltage of the current from the automatic controller (33). A waterproof speaker (21) receives the horn auditory signal (56) and the human voice auditory signal (55), and emits sound within a localized area of 150 feet.

The waterproof speaker (21) is preferably mounted at the top of a heavy vehicle's cab (16), at the tail-light (021), at the mirrors or mirror brackets (022), or near a typical mounting of a horn (57). In the alternative, the waterproof speaker (21) is mounted at the rear of a heavy vehicle so as to emit the horn auditory signal and the human voice auditory signals near a portion of the heavy vehicle (58), which usually produces excessive noise. It is contemplated such a rearward mounting of the waterproof speaker (21) would provide effective competing emission of the horn auditory signal (56) and the human voice auditory signals (55). Upon activation of the backup switch (15), the human voice auditory sound chip (55) emits the horn auditory signal twice in succession, with a delay of approximately $\frac{1}{20}$ of a second, at 120 decibels. The delay time is significant because it serves as an alert call to signal individuals to listen for a more informative message. At a delay of $\frac{1}{10}$ of a second after the horn auditory signal (56) has been emitted, the human voice auditory signals (55) are sounded. The delay in timing for the voice auditory signals is significant because traditional safety environments mandate communication of safety messages in less than two seconds to prompt action.

The human voice auditory signal (55) will convey the message, "Attention! Please stand clear, this refuse truck is backing." It is anticipated that message would be specific to the unique character of the subject vehicle, such that the words "refuse truck" would be replaced by a unique description of the vehicle within which the present invention has been installed. The message could be repeated successively in Spanish, French, or any other desired language. The present invention employs a second school bus (62) "stop sign arm" voice auditory safety system to prevent injuries when a school bus (62) unloads students. Implementing the present invention, school bus stop sign arm safety system (05) creates two optimal situations. First, drivers of nearby vehicles are warned that the school bus (62) is planning to make a sudden stop. This is critical because current methods of alerting drivers to sporadic school bus (62) braking do not always convey the message quickly enough for the drivers to respond in a desired fashion. Second, drivers of nearby vehicles are alerted that students will be moving towards and emanating from the school bus (62) after it stops. The present invention ensures that drivers are aware that sudden darting and straggling students may enter the roadway. To warn nearby vehicles that the school bus (62) is braking, the present invention employs an audible siren signal, accessed from the human voice auditory sound chip (55), which is played for $\frac{1}{10}$ of a second from the speaker (21), mounted atop the cab (16) or within the vicinity of the vehicle. In one embodiment of the present invention, the audible siren signal is activated when conventional yellow caution lights (61) flashes from the school bus (62). A push in switch (63) is located at the base of the stop sign arm.

When the stop sign arm (05) is completely extended, the ground terminal (59) of the push in switch (63) will be grounded, allowing current pulse to flow to the output terminal of the switch (63) to the data dictionary (23). The data dictionary (23) will then relay the appropriate codes to the CPU (22), to be relayed to the human voice auditory sound chip (55) and amplified by the amplifier (30) to passerby. In the alternative, a three terminal push in switch (60) is employed, wherein current flows to one terminal at all times when the stop arm (05) is idle. The three terminal switch (60) allows constant current on one terminal (60a), a ground on the second terminal (60b) that will receive its grounding when the base plate (05a) begins to move. The third terminal (60c) relays said base plate, motioning signal to the data dictionary (23) to enable a prescribed response. As the stop sign arm (05) begins to motion outward, a base plate (05a) of the said stop sign arm (05) will push in on the switch button (64), enabling the ground terminal (60b) to be grounded, initiating the switch (60) to stay closed on conduction. The conducting current will then relay from the grounded terminal (60b) to the siren to alert drivers that the vehicle intends to stop. When the stop arm sign (05) is wholly extended, the ground terminal (60b) will fully be grounded to enable the switch circuitry to be completed, energizing input to the data dictionary for the school bus arm terminal to close and allow signal conduction. The input terminal will then signal the CPU (22) to relay a signal to the sound chip (55) for a prescribed human voice auditory warning to be broad. To alert drivers that students will be crossing roads around the school bus (62), the present invention further employs the second human voice auditory signal, accessed from the sound chip, which is played in a continuous loop.

When the conventional stop sign arm (05) is fully extended to visually reminding drivers to lawfully stop when a school bus (62) brakes or stops to unload students, the present invention will employs a human voice auditory signal activation subsequent to the siren auditory signal. The present invention activates the human voice warning mechanism prior to the siren/alarm function. As long as the stop sign arm (05) is extended, the human voice auditory signal will preferably intone the following message: "Please stop at 25 feet; this vehicle is coming to a complete stop." By incorporating the siren auditory signal and the human voice auditory signal, the present invention keep vehicles at a safe distance from children near the school bus (62). It is anticipated that the "25 feet" wording of the voice recording will be modified in accordance with the requirements of the local laws of various regions in which the present invention is utilized. The present invention incorporates a third driver safety system by which the driver/operator of a heavy-duty truck (092), school bus (62), or any transportation equipment (09) is alerted to exhibit behavior in accordance with established safety principles.

As with the previous safety systems, the same circuit path is relayed to emit the human voice warning. When a heavy-duty truck or school bus has stopped and the parking brake (65) is applied, a "1" is relayed to the braking chip (66), to acknowledge that the vehicle is parked and stopped. The braking chip (66) contains three logical sequence relays. The first sequence AA (67) monitors the parked condition until the brake is attempted for release. When signal is received from the transmission terminal (26) after the transmission is engaged in a reverse mode, said signal would be sent to the data dictionary (23) that will align the said coded signal with its prescribed sound chip signaling.

At the point of attempted brake release, sequence AA (67) will create a "0" to disable itself, and sequence BB (68) will be implemented. Sequence BB (68) will activate a current pulse to the sound chip to emit the human voice warning. An example of a warning signal that may be emitted is "Walk around to ensure that the surroundings are clear of children, pedestrians, or obstacles before proceeding." The voice signals will continue to sound until the driver again tries to release the parking brake, or for 30–35 seconds, whichever lapses sooner. At the point in which the vehicle is in motion and the brake is in full release, sequence CC (69) is relayed. At the emission of sequence CC (69), the automatic controller (33) will emit a signal to the data dictionary to initiate a standby until further warning is enabled. The present invention incorporates a fourth technical safety on hydraulic lift (10), dumping equipment (11), tailgate mechanism (12), hydraulic cylinder operated safety (14), and hydraulic systems for front-end loader vehicles. The purpose of this system is to remind a driver, technician, or a mechanic to manually lock cylinder (100), before attempting to work around the opened or lifted area, or within the cylinder operated devices. The safety system for the present invention eliminates possible mechanical failure types of accidents of common incidence. When the tailgate mechanism (12) is open or the body of the truck (092) is up, or the bed (92) raised on roll-off and front-end loader vehicles, the same logic sequence as described in regards to the brake, will occur to ensure safety. An on/off switch is mounted in the cylinder-housing base (93), with an activation switch (94) attached to the housing (95).

So that when any of the cylinder (100) is raised, the switch (94) will be activated to the on position, enabling the switch circuit to close, sending signal to the CPU (22) indicative of the behavior of the tailgate mechanism (12), or applicable similar behavior of other devices. The output terminal of the switch (94) will relay to the circuit of the data dictionary (23), to energize the hydraulic control chip (110), which receives a "1" when a cylinder is open. The hydraulic control chip (110) will then relay to the CPU (22), which empowers the human voice auditory sound chip (55) to emit a human voice auditory warning such as "Tailgate (12) open, please lock the piston ends (120) of the cylinders (100)." In summary, the above-described audio safety device (00) provides for ease of installation and removal, thus providing significant labor savings. The reusability of all components provides further economy. Moreover, the communication system embodied in the present invention ensures that warning messages are sent, regardless of weather condition severity. It is to be understood that the present invention is not limited to the sole embodiment described above, but encompasses any and all embodiments within the scope of the following claims.

What is claimed is:

1. Advanced audio safety apparatus for use with a vehicle and transportation equipment having at least a transmission means, a braking means, and a backing means, for enabling communication signal indicative of communicating at least a predetermined mechanical operation of said vehicle and for broadcasting the said mechanical operation in human voice auditory response thereon, comprising:

a. at least a switch terminal means responsible for energizing said communication signal responsive to said predetermined mechanical condition of a vehicle with the potential to cause injury;

b. an input terminal in connection with a logic switch means for receiving current from said switch terminal and for identifying said energized communication signal indicative of coded data transmission responsible for activating at least a defined voice auditory in response to at least a prescribed predetermined mechanical operation of said vehicle;

c. at least a control means having at least a central processing unit CPU for relaying communication signals and for retrieving said energized signal indicative of communicating with plurality switches, said switches responsive for initiating at least a human voice auditory response with at least a voice auditory chip referencing at least a prescribed mechanical operation of at least a vehicle;

d. means for transforming said energized communication signal into pre-selected human voice auditory communication signal indicative of vehicle normal mechanical operation;

e. an internal logical interface means in communication with said central processing unit;

f. at least a voltage suppressor means in communication with said internal logical interface means responsive for filtering out unwanted voltage;

g. a braking means in communication with at least a chip having at least embedded human voice, and said chip enables communication with said central processing unit;

h. an automatic controller means in communication with at least a switch terminal means for allowing operation of at least a controlled energy means, said controlled energy means responsive for enabling signal communication to said predetermined mechanical component of at least a vehicle, wherein said controlled energy means further enables comparing said coded signals at the logic switch means indicative of operative target of at least a predetermined mechanical operation of a vehicle for enabling activation of at least a specific human voice auditory responses unique to at least said switch terminal output energy source;

i. a database means responsive for data dictionary, said data dictionary in communication with said at least a voice auditory sound chip for defining unique and prescribed human voice auditory messages, and wherein said sound chip in communication with at least a logic interface means for selectively broadcasting said defined human voice auditory response indicative of at least a discernible message;

j. human voice auditory sound chip means responsive for said output and for communicating with said database means, wherein said database means responsive for said human voice auditory output to at least a broadcasting means responsive for amplifying said output signal, and wherein said broadcasting means further includes means for emitting responses indicative of safety warning in response to potentially predetermined mechanical operation associated with the components of at least a vehicle;

k. a microprocessor means in communication with said automatic control means for processing said database system;

n. an amplifier means in connection with said automatic control means, said automatic control means being in communication with said voice auditory sound chip and said amplifying means for receiving and amplifying said human voice auditory communication signal for enabling sound clarity; and o. a water proof speaker means mounted internal/external to the body of said vehicle for broadcasting said amplified sound signal.

2. Advanced audio safety apparatus as claimed in claim 1, wherein said switch terminal enables communication signal indicative of at least a vehicle transmission in a reverse mode, for initiating selective and prescribed human voice auditory communication signal for broadcasting to at least a passer-by external and/or rearward to the vehicle in response to said vehicle reverse motion, and wherein a delay delays said communication signal response after at least every second.

3. Advanced audio safety apparatus as claimed in claim 2, wherein said switch terminal enables communication signal to at least a data identifying means indicative of at least a defined pre-mechanical operation of at least a vehicle, said pre-mechanical operation enables selective and prescribed data transmission through energized communication signal indicative of broadcasting said data responsive for at least a unique human voice auditory in recognition of said predetermined mechanical operation of at least a vehicle component and wherein said predetermined mechanical operation further includes at least any of:

a. a transmission engaged in a reverse direction;
b. a school bus stop sign arm extended;
c. a parking brake released;
d. a tailgate raised/opened;
e. a plane traveling in a reverse direction;
f. a bed of a front-end loader raised;
g. a cement mixer truck funneling cement and the chute either being raised/lowered.

4. Advanced audio safety apparatus as claimed in claim 3, wherein said logical interface means comprising a central processing unit for communicating said energized signal from at least a switch terminal means to a database means responsive for initiating said human voice auditory signal indicative of at least a mechanical operational behavior of at least a vehicle to at least a delay for broadcasting and delaying said responses in repeating times to a passer-by external to the vicinity of said vehicle, and wherein said voice auditory signal is generated to a waterproof speaker mounted at least a top a cab of a vehicle.

5. Advanced audio safety apparatus as claimed in claim 4, wherein said operational behavior of at least a vehicle includes at least a vehicular component, and wherein said vehicular component having a switch terminal means for signaling upon activation indicative of predetermined mechanical operation of said vehicle, said mechanical operation enables communication between said switch terminal means and at least an automatic control means, said control means allowing operational control of energy means to enable communication signal indicative of at least a human voice auditory responses unique to said vehicle component and switch terminal output source and wherein said energy means in communication with said amplifier means for generating said amplified voice auditory sound signal to a waterproof speaker, said speaker located near a noise producing portion of said vehicle.

6. Advanced audio safety apparatus as claimed in claim 5, wherein said central processing unit comprising at least a sound chip in communication with database means responsible for outputting coded signal indicative of broadcasting at least a predetermined mechanical operation of at least a vehicle, and wherein said coded signal operable in human voice auditory response through amplifying means to at least a water proof speaker for enabling signal emission to at least a vicinity of said vehicle operation, and wherein said signal emission further response to predefined set of horn auditory signal.

7. Advanced audio safety apparatus as claimed in claim 6, wherein said predetermined mechanical operation defines an alerting condition whereby at least an operating vehicle influences attention on a passenger and passer-by during normal vehicle operation, includes school bus stop sign indicative of predetermined mechanical operation of said vehicle, said communication signal reflective to human voice auditory response indicative of broadcasting at least an intended unique mechanical operation of said vehicle.

8. Advanced audio safety apparatus as claimed in claim 7, wherein said predetermined mechanical condition, includes operation of at least a tailgate of at least a dump truck, and wherein said tailgate comprises a switch terminal for enabling communication indicative of broadcasting operational sequences when the said tailgate is being raised, and further comprises a bed of at least a front-end loader vehicle responsive for allowing current pulses to enable selected human voice auditory communication in response to said mechanical operation for broadcasting thereon.

9. Advanced audio safety apparatus, as claimed in claim 8, wherein said means for enabling said discernable message in response to said output from at least a switch terminal for a vehicle component responsible for outputting electrical energy, said electrical energy responsive for activating signal communication means in response to said switch terminal output, said electrical energy further responsive for enabling human voice auditory signal communication in response to specific vehicle component pre-mechanical operation, wherein said communication for pre-mechanical operation of a vehicle is broadcast through at least a speaker means.

10. Advanced audio safety apparatus for a vehicle and transportation equipment having at least a transmission means, a braking means, and a backing means for communicating a safety warning process by alerting pedestrians, vehicle drivers, and vehicle passengers in human voice auditory response the predetermined mechanical operation of a vehicle component, the advanced audio safety apparatus comprising:

a. at least a switch terminal means, for activating initial controlled energy indicative of initiating broadcasting of selected and prescribed voice auditory message;
 b. a control means having at least a central processing unit "CPU," for coordinating and processing said switch terminal signals to at least a voice auditory chip;
 c. at least a human voice auditory sound chip, for producing sound signal response in human voice auditory for enabling a discernable message;
 d. at least a waterproof speaker means, for broadcasting said discernable message;
 e. a logic interface means, for enabling interactive signal communication from said sound chip to at least an amplifier means;
 f. an amplifier means, for empowering said broadcasting messages responsive for communicating operating signals from at least a predetermined mechanical component of a vehicle; and
 g. at least a microprocessor having at least a chip, said chip having embedded human voice representing responses to said predetermined mechanical operation of a vehicle component.

11. Advanced audio safety apparatus for alerting pedestrians, vehicle driver, and vehicle passengers as claimed in claim 10, wherein said predetermined mechanical operation of a vehicle occurs when any one of: a transmission is shifted to a reverse direction, a parking means operable in releasing mode, a stop sign arm operable in extending mode, a concrete mixer vehicle operable in funneling mode, vehicle tailgate operable in opening mode, a plane traveling in a reverse direction, and a vehicle bed operable in raising mode, for energizing said central processing unit responsive for coordinating selective and prescribed discernable message in response to said switch terminal output, and wherein said switch terminal is responsive to automatic means.

12. Advanced audio safety apparatus for alerting pedestrians, vehicle drivers, and vehicle passengers as claimed in claim 11, wherein said predetermined mechanical operation of a vehicle occurs when a school bus stop sign arm is extended and activating a switch, said switch output signal activating a sound chip to responsively activating said discernable message for alerting pedestrians, vehicle drivers, and vehicle passenger in human voice auditory response indicative of at least a predetermined mechanical operation of a vehicle component.

13. Advanced audio safety apparatus for alerting pedestrians, vehicle drivers, and vehicle passengers, as claimed in claim 12, wherein said discernible message for alerting pedestrians, vehicle drivers, and vehicle passengers occurs when at least a driver attempts to release the vehicle parking brake, and includes at least a school bus and industrial and/or commercial vehicle operation responsively outputting selective and predefined human voice auditory in response to a switch terminal energy responsive for broadcasting at least said pre-mechanical operation of a vehicle component.

14. Advanced audio safety apparatus for alerting pedestrians, vehicle drivers, and vehicle passengers, as claimed in claim 13, wherein said discernible message for alerting pedestrians, vehicle drivers, and vehicle passengers occurs when a vehicle's tailgate is open or said vehicle's bed is up, and further includes vehicle pre-mechanical operation for outputting said discernable message in response to said pre-mechanical operation of said vehicle component for enabling human voice auditory responses indicative of broadcasting said operation thereon, and wherein said voice auditory response may be selected from a predefined set horn auditory signals.

15. A safety warning process of an advanced audio apparatus for alerting pedestrians, vehicle drivers, and vehicle passengers, said safety warning process further enables enforceable means of controlling the resultant behavior of said vehicle driver, said vehicle passenger, and said pedestrians upon operation of said vehicle, said process comprising steps of:

a. activating a switch terminal, said switch terminal automatically responsive to predetermined mechanical conditions of a vehicle with potential to cause injury;
 b. providing current from said switch terminal to at least an input terminal of at least a logical interface means, said logical interface means containing at least a receiving means and a transmitting means for receiving and transmitting said signal to at least a device responsive for outputting voice auditory communication messages;
 c. transforming said current into control energy;
 d. dividing said control energy into a predetermined controlled human voice auditory message;
 e. comparing said control energy with pre-selected data and generating at least an output;
 f. emitting said output in voice auditory response and/or at least a discernable message representing specific predetermined mechanical operation of the vehicle's components to the vehicle's surrounding;
 g. emitting plurality of discernable messages for educational voice sound signals response corresponding to said output; and
 h. amplifying said discernable voice sound signal response to at least a speaker means capable of transmitting said sound signal response within a localized area, to individuals both inside and outside a vehicle.

16. The safety warning process of an advanced audio safety apparatus for alerting pedestrians, vehicle drivers, and vehicle passengers as claimed in claim 15, wherein at least one of said predetermined mechanical operations of a vehicle occurs when at least a transmission is engaged in a reverse direction.

17. The safety warning process of an advanced audio safety apparatus for alerting pedestrians, vehicle drivers, and vehicle passengers, as claimed in claim 16, wherein at least one of said predetermined mechanical operations of a vehicle occurs when at least a school bus stop sign arm is extending.

18. A safety warning process of an advanced audio safety apparatus for alerting pedestrians, vehicle drivers, and vehicle passengers, as claimed in claim 17, wherein said predetermined mechanical operation of a vehicle occurs when a driver of the vehicle attempts to release a vehicle's parking brake.

19. A safety warning process of an advanced audio safety apparatus for alerting pedestrians, vehicle drivers, and vehicle passengers, as claimed in claim 18, wherein said predetermined mechanical operation of a vehicle occurs when a concrete mixer vehicle is operable in a funneling mode, a vehicle's tailgate is operable in an opening mode, a plane traveling in a reverse direction, and a vehicle's bed is operable in a raising mode.

20. A safety warning process of an advanced audio safety apparatus for alerting pedestrians, vehicle drivers, and vehicle passengers, as claimed in claim 19, wherein said voice auditory sound signal response is produced by a sound chip, and wherein said sound signal response may be selected from a predetermined set of voice signals and repeated over predetermined period of time.

* * * * *